US009227275B2

(12) United States Patent                                  (10) Patent No.:     US 9,227,275 B2
     Yamamoto                                              (45) Date of Patent:     Jan. 5, 2016

(54) METHOD FOR MANUFACTURING GOLF CLUB HEAD

(71) Applicant: DUNLOP SPORTS CO. LTD., Kobe-shi, Hyogo (JP)

(72) Inventor: Akio Yamamoto, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 0 days.

(21) Appl. No.: 13/905,397

(22) Filed: May 30, 2013

(65) Prior Publication Data

US 2013/0320072 A1    Dec. 5, 2013

(30) Foreign Application Priority Data

May 31, 2012    (JP) .................................. 2012-124130

(51) Int. Cl.
  *B23K 31/02*     (2006.01)
  *B23K 37/04*     (2006.01)
  *A63B 53/04*     (2015.01)

(52) U.S. Cl.
  CPC ............. *B23K 37/04* (2013.01); *A63B 53/0466* (2013.01); *A63B 53/047* (2013.01); *A63B 53/0487* (2013.01); *A63B 2053/045* (2013.01); *A63B 2053/0433* (2013.01); *A63B 2053/0454* (2013.01); *A63B 2053/0491* (2013.01)

(58) Field of Classification Search
  CPC ............ B23K 5/00; B23K 9/00; B23K 15/00; B23K 37/04; B23K 37/02; B23K 37/00; B23K 3/087; A63B 49/00; A63B 49/04; A63B 49/007; A63B 49/02
  USPC ...................... 228/228, 227, 212; 21/725, 733
  See application file for complete search history.

(56) References Cited

U.S. PATENT DOCUMENTS

| 4,729,804 | A  | * | 3/1988  | Dillner .......................... 156/91 |
| 6,813,821 | B1 | * | 11/2004 | Tseng ........................ 29/527.6 |
| 2001/0031708 | A1 | * | 10/2001 | Maeda et al. ................ 508/155 |
| 2006/0189410 | A1 |   | 8/2006  | Soracco et al. |
| 2007/0287552 | A1 | * | 12/2007 | Sugimoto ..................... 473/345 |

FOREIGN PATENT DOCUMENTS

JP    10-337347 A       12/1998
TW    201020059 A   *   6/2010

OTHER PUBLICATIONS

Computer english abstract TW 201020059 A Jun. 2010.*

* cited by examiner

*Primary Examiner* — Erin Saad
(74) *Attorney, Agent, or Firm* — Birch, Stewart, Kolasch & Birch, LLP

(57) ABSTRACT

A method for manufacturing a head 2 includes the steps of:
  (A) producing a plurality of head components Ph;
  (B) welding at least two of the head components Ph to each other while abutting the head components Ph on a guide core gc1; and
  (C) removing the guide core gc1.

Preferably, the guide core gc1 is made of a water-soluble material. Preferably, at least one of the head components Ph is produced by a press process. Preferably, the guide core gc1 has a lack part Ms1. Preferably, existence of the lack part Ms1 avoids contact between a welding joint part wd1 and the guide core gc1 in the step B.

13 Claims, 9 Drawing Sheets

METHOD FOR MANUFACTURING GOLF CLUB HEAD

The present application claims priority on Patent Application No. 2012-124130 filed in JAPAN on May 31, 2012, the entire contents of which are hereby incorporated by reference.

BACKGROUND OF THE INVENTION

1. Field of the Invention

The present invention relates to a method for manufacturing a golf club head.

2. Description of the Related Art

A head obtained by welding a plurality of components has been known. For example, in a head having a hollow part, a plurality of components are usually welded.

Japanese Patent Application Laid-Open No. 10-337347 discloses a head obtained by welding a first forged product and a second forged product. Japanese Patent Application Laid-Open No. 2007-236945 (US2006/0189410) discloses a golf club head to which a hitting face is welded.

SUMMARY OF THE INVENTION

In a golf club head, specifications such as a loft angle, a lie angle, and a face angle are set. High accuracy is required for these specifications. When a plurality of components are welded, a deviation may be generated in the position and the angle between the components. The deviation may generate variation in the specification of the head. The deviation may generate an error in the specification of the head. The deviation causes variation in the shape of the head.

It is not easy to weld a plurality of members while fixing the members with accuracy. A manufacturing method for welding the plurality of components has low productivity. The low productivity increases a manufacturing cost.

It is an object of the present invention to provide a highly accurate golf club head.

A method for manufacturing a golf club head of the present invention includes the steps of:

(A) producing a plurality of head components;
(B) welding at least two of the head components to each other while abutting the head components on a guide core; and
(C) removing the guide core.

Preferably, the guide core is made of a water-soluble material.

Preferably, at least one of the head components is produced by a press process.

Preferably, the guide core has a lack part which is lacked in relation to a shape of a hollow part of the head. Preferably, existence of the lack part avoids contact between a welding joint part and the guide core in the step B.

Preferably, each of at least two of the head components has a connecting part. Preferably, the connecting parts are connected to each other in the step B. Preferably, a contact area between the guide core and the head components is increased in the abutment of the step B by the connection.

Preferably, the method further includes the step of:

(D) removing the connecting parts after the welding.

DESCRIPTION OF THE PREFERRED EMBODIMENTS

Hereinafter, the present invention will be described in detail based on preferred embodiments with appropriate reference to the drawings.

Figure 1:
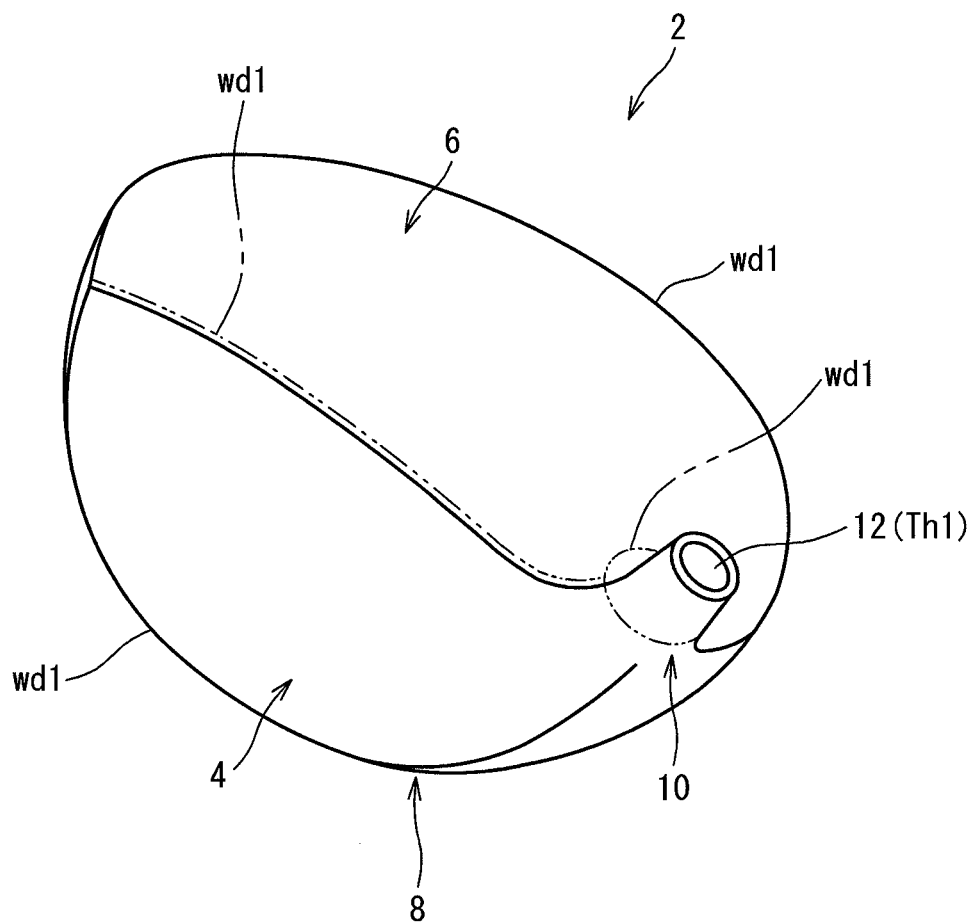
FIG. 1 is a perspective view of a golf club head according to one embodiment of the present invention.
Figure 2:
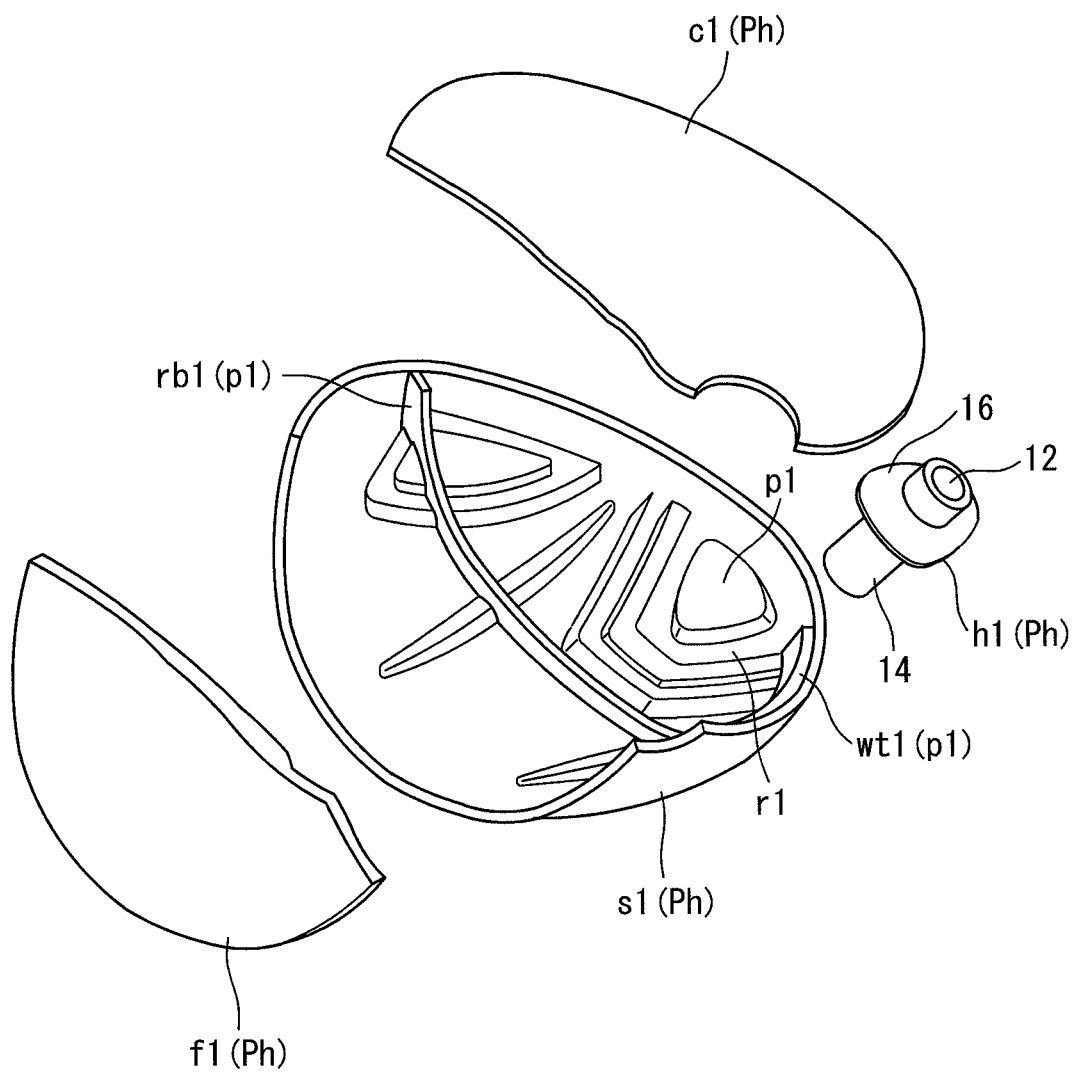
FIG. 2 is an exploded perspective view of the head of FIG. 1.

A head 2 shown in FIG. 1 is a wood type head. The head 2 is a hollow head. As shown in FIG. 2, the head 2 has a face 4, a crown 6, a sole 8, and a hosel 10. The hosel 10 has a shaft hole 12. Although not shown in the drawings, face lines are formed on the face 4.

The types of the heads are preferably a wood type, a utility type, and a hybrid type. These heads usually have a hollow part. The embodiment is suitable for the head having the hollow part. Of course, the present invention can be applied also to heads such as an iron type head and a putter type head.

As shown in FIG. 2, the head 2 is manufactured by joining a plurality of head components Ph. As described later, in the embodiment, the joining is welding. The welding and other joining (adhesion or the like) may be mixed.

The plurality of head components Ph constituting the head 2 are a face member f1, a crown member c1, a sole member s1, and a hosel member h1.

The material of the head component Ph is not limited. Preferable examples of the material include a metal, CFRP (carbon fiber reinforced plastic), and a combination thereof. The material is more preferably a metal. Examples of the metal include a titanium alloy, stainless steel, an aluminium alloy, a magnesium alloy, and a combination thereof. A method for manufacturing each member constituting the head component Ph is not limited. Examples thereof include forging, casting, pressing, an NC process, and a combination thereof. In the embodiment, all the head components Ph are made of the titanium alloy.

The head 2 has a welding joint part wd1. The welding joint part wd1 is located on a boundary part between the head components Ph.

The face member f1 constitutes at least a part of the face 4. In the embodiment, the face member f1 constitutes the whole of the face 4.

The crown member c1 constitutes at least a part of the crown 6. In the embodiment, the crown member c1 constitutes the greater part of the crown 6.

The sole member s1 constitutes at least a part of the sole 8. In the embodiment, the sole member s1 constitutes the whole of the sole 8.

The hosel member h1 constitutes at least a part of the hosel 10. In the embodiment, the hosel member h1 constitutes a part of the hosel 10. The hosel member h1 constitutes the whole of the shaft hole 12. The hosel member h1 has a tubular part 14. The inner peripheral surface of the tubular part 14 is the shaft hole 12. The hosel member h1 has an outward extending part 16. The outward extending part 16 has an approximately umbrella shape. The outward extending part 16 constitutes a part of the crown 6.

Figure 3:
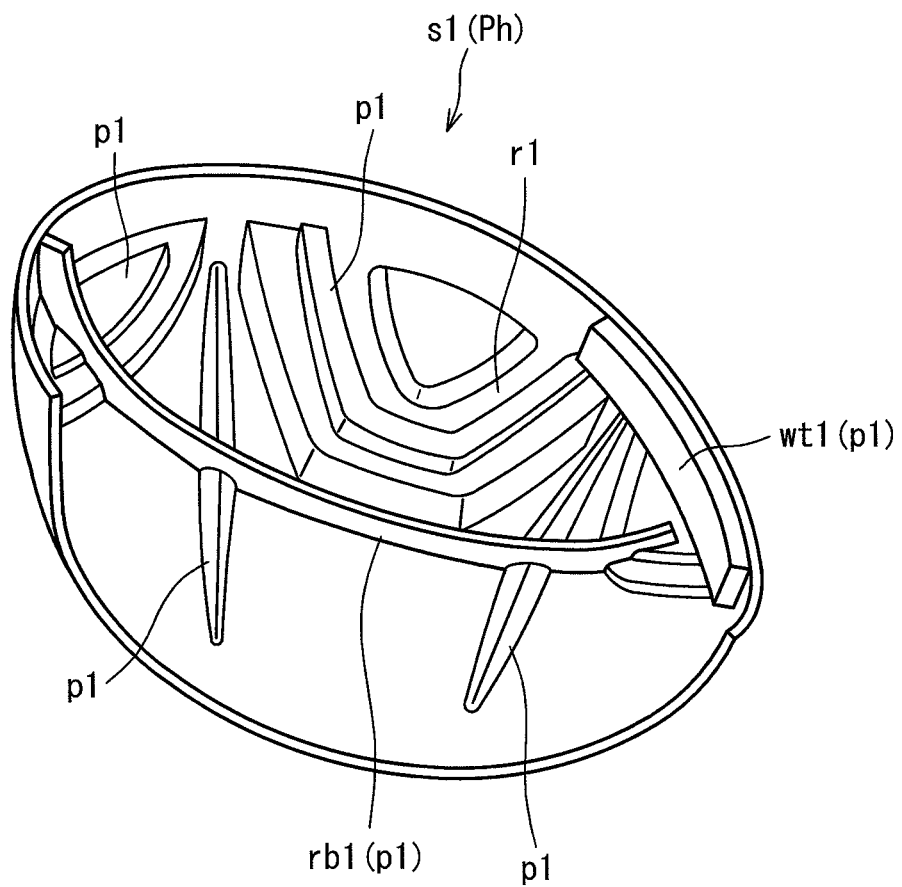
FIG. 3 is a perspective view of a sole member shown in FIG. 1.

FIG. 3 is a perspective view of the sole member s1. A rib rb1 and a weight member wt1 are disposed on the inner surface of the sole member s1. The rib rb1 is formed separately from the sole member s1. The rib rb1 is joined to the inner surface of the sole member s1. The joining is performed by welding. The weight member wt1 is formed separately from the sole member s1. The weight member wt1 is joined to the inner surface of the sole member s1. The joining is welding.

The face member f1 is formed by subjecting a rolled material to a press process. The sole member s1 is formed by subjecting a rolled material to a press process. The crown member c1 is formed by subjecting a rolled material to a press process. The hosel member h1 is formed by a cutting process. The cutting process is an NC process (CNC process). A method for manufacturing each member is not limited.

The plurality of head components Ph are materials capable of being welded to each other. The head 2 is manufactured by welding the head components Ph. Although not shown in the drawings, the head 2 has a hollow part. The shaft hole 12 makes the hollow part communicate with the outside of the head. In other words, the head 2 has a communicating hole Th1 making the hollow part communicate with the outside of the head. In the embodiment, the shaft hole 12 is the communicating hole Th1.

A recess part and/or a projection part are/is provided on the inner surface of the sole member s1. As shown in FIG. 3, a projection part p1 and a recess part r1 are provided on the inner surface of the sole member s1 of the embodiment. A plurality of projection parts p1 are provided on the sole member s1. Many projection parts p1 are provided on the sole member s1. In addition to the projection part p1 formed by the sole member s1 itself, the weight member wt1 and the rib rb1 also form the projection part p1. That is, the weight member wt1 forms the projection part p1. The rib rb1 forms the projection part p1.

Although not shown in the drawings, the recess part r1 and the projection part p1 are provided also on the inner surface of the face member f1.

Figure 4:
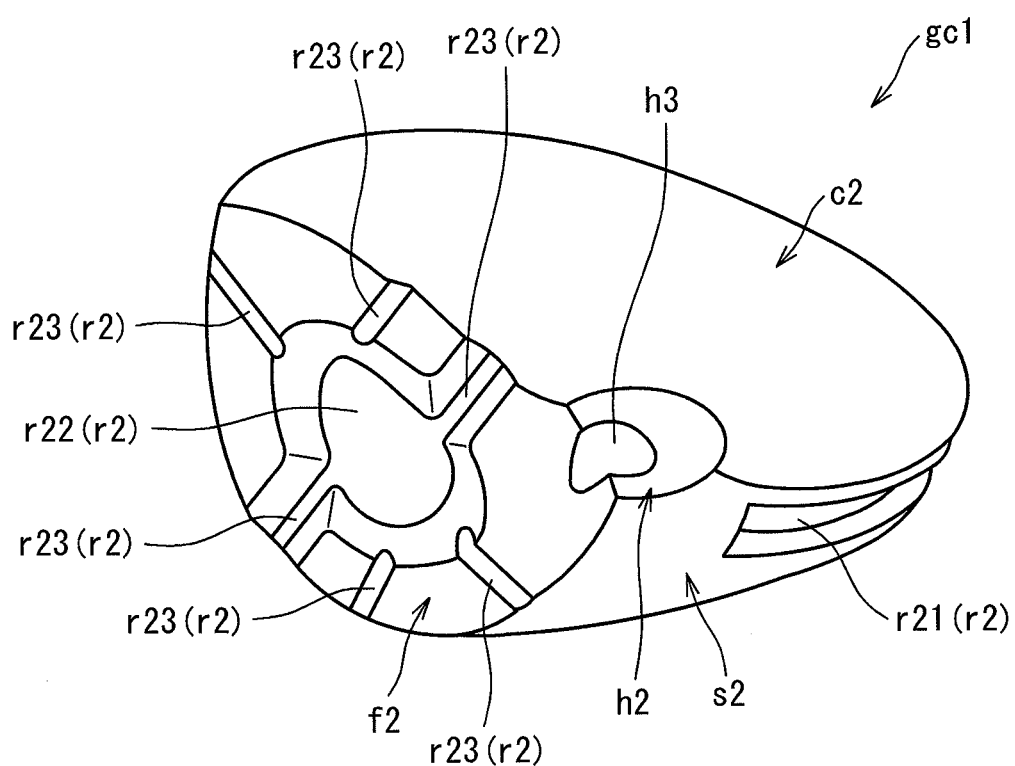
FIG. 4 is a perspective view of a guide core used for manufacturing the head of FIG. 1.
Figure 5:
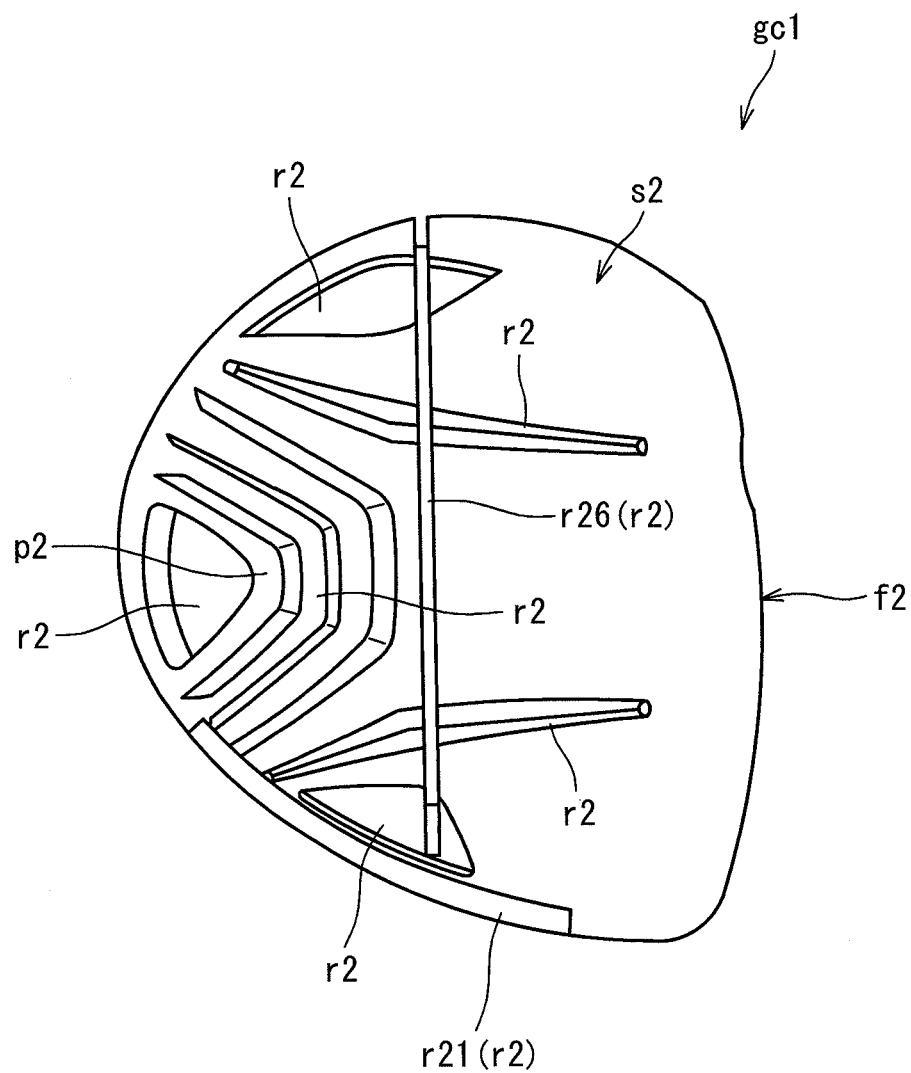
FIG. 5 is a bottom view of the guide core of FIG. 4.

FIG. 4 is a perspective view of a guide core gc1 used for manufacturing the head 2. FIG. 5 is a bottom view of the guide core gc1. The guide core gc1 has a face member abutting part f2, a crown member abutting part c2, a sole member abutting part s2, and a hosel member abutting part h2. The hosel member abutting part h2 has a hosel member inserting hole h3.

The guide core gc1 is solid. The shape of the outer surface of the guide core gc1 is substantially equal to that of the hollow part of the head 2. The shape of the outer surface of the guide core gc1 is substantially equal to that of the inner surface of the head 2.

The guide core gc1 may have a hollow part. In this case, removal in the following step C can be facilitated.

As described above, at least one of the head components Ph has the recess part r1 and/or the projection part p1 provided on the inner surface side thereof. On the other hand, the guide core gc1 has at least one projection part p2 and/or at least one recess part r2. The guide core gc1 of the embodiment has a plurality of recess parts r2 (see FIG. 5).

The recess part r1 of the head component Ph corresponds to the projection part p2 of the guide core gc1. The projection part p1 of the head component Ph corresponds to the recess part r2 of the guide core gc1.

[Method for Manufacturing Head]

A method for manufacturing the head 2 includes the following steps A to C:
 (A) producing a plurality of head components Ph;
 (B) welding at least two of the head components Ph to each other while abutting the head components Ph on a guide core gc1; and
 (C) removing the guide core gc1.

As for the step A, at least one of the head components Ph is preferably produced by a press process. The process temperature of the press process is not limited. The press process may be a cold press, a warm press, or a hot press. The cold press is a press process without heating. Examples of the method for manufacturing the head component Ph other than the press process include forging, casting, die-casting, and cutting out (cutting process).

In the step B, preferably, all the head components Ph are abutted on the guide core gc1. Each of the head components Ph is disposed at a corresponding position of the guide core gc1. Each of the head components Ph is positioned by the abutment on the guide core gc1. The head components Ph are relatively positioned by the abutment on the guide core gc1. An angle between the head components Ph is set with accuracy by the positioning. A positional relationship between the head components Ph is set with accuracy by the positioning effect. Since an abutting surface between the head components Ph and the guide core gc1 is a three-dimensional curved surface, the positioning effect provided by the abutment is high.

In the step B, the crown member c1 is abutted on the crown member abutting part c2. The abutment is surface contact. In the step B, the sole member s1 is abutted on the sole member abutting part s2. The abutment is surface contact. In the step B, the face member f1 is abutted on the face member abutting part f2. The abutment is surface contact. In the step B, The hosel member h1 is abutted on the hosel member abutting part h2. The abutment is surface contact. A high positioning effect can be exhibited by these surface contacts. In the step B, the hosel member h1 (tubular part 14) is inserted into the hosel member inserting hole h3. A high positioning effect can be exhibited by the insertion.

In the step B, an abutment maintaining mechanism for maintaining the abutment between the head components Ph and the guide core gc1 may be used. That is, preferably, in the step B, the abutment between the head components Ph and the guide core gc1 is maintained by the abutment maintaining mechanism. Examples of the abutment maintaining mechanism include adhesion, an external jig, and an engaging mechanism. An example of the engaging mechanism will be described later.

Preferably, in the step B, the head specification is measured in a state where at least two of the head components Ph are abutted on the guide core gc1. Preferably, in the step B, the positions and/or postures of the head components Ph are adjusted based on the measured value of the head specification.

Preferably, in the step B, the head specification is measured while the head components Ph are fixed by the abutment maintaining mechanism in a state where at least two of the head components Ph are abutted on the guide core gc1. Preferably, the positions and/or postures of the head components Ph are adjusted while the head components Ph are fixed by the abutment maintaining mechanism.

An adhesive is used in an example of the adhesion. The adhesive is preferably an instant adhesive. One example of the instant adhesive is a cyanoacrylate-based adhesive. The adhesive consists primarily of cyanoacrylate. The adhesive reacts with moisture present in the air or the like, and is cured. The adhesion is attained by the curing. The working hour of the step B can be shortened by utilizing the instant adhesive.

In the step B, the adhesive bonding the guide core gc1 and the head components Ph may be destroyed by heat generated by the welding. In this case, the remaining of the guide core gc1 in the step C is suppressed. Therefore, the removal in the step C is further facilitated.

In the step B, the recess part r1 of the head component Ph is abutted on the projection part p2 corresponding to the recess part r1. The abutment between the recess part r1 and the projection part p2 enhances the positioning effect. In the step B, the projection part p1 of the head component Ph is abutted on the recess part r2 corresponding to the projection part p1. The abutment between the projection part p1 and the recess part r2 enhances the positioning effect.

Preferably, the abutment of the step B is surface contact. Preferably, the abutment between the projection part p1 and the recess part r2 is surface contact. Preferably, the abutment between projection part p2 and the recess part r1 is surface contact. The positioning effect is enhanced by the surface contact.

The external jig as the abutment maintaining mechanism presses the head components Ph to the guide core gc1 from the outside in order to maintain the abutting state in the step B, for example. The external jig may be a structure such as a mold. The external jig has a space permitting a welding operation. The external jig can maintain the abutment between the head components Ph and the guide core gc1 while securing the space permitting the welding operation.

Other examples of the abutment maintaining mechanism include a connecting means for connecting the guide core gc1 and the head components Ph. Examples of the connecting means include a screw connecting the guide core gc1 and the head components Ph. In this case, for example, the head components Ph have a through hole, and the guide core gc1 has a female screw hole. In this case, a male screw is screwed into the female screw hole while the male screw is inserted into the through hole. The head components Ph and the guide core gc1 are connected by the screwing.

In the abutment of the step B, one or more projection parts p1 are engaged (contacted) with the recess parts r2 corresponding to the projection parts p1. The concavo-convex engagement enhances the positioning effect. In the abutment of the step B, one or more recess parts r1 are engaged (contacted) with the projection parts p2 corresponding to the recess parts r1. The concavo-convex engagement enhances the positioning effect.

As described above, the rib rb1 of the sole member s1 constitutes the projection part p1 (see FIG. 3). In the step B, the projection part p1 constituting the rib rb1 is engaged with a groove-shaped recess part r26 corresponding to the rib rb1 (see FIG. 5). The concavo-convex engagement enhances the positioning effect. The rib rb1 contributes also to an improvement in a hitting sound. The rib rb1 contributes to both the improvement in the hitting sound and the improvement in the positioning effect.

In the embodiment, at least one of the head components Ph has the rib rb1 provided on the inner surface thereof. The guide core gc1 has a recess part r26 corresponding to the rib rb1. In respect of enhancing the positioning effect, preferably, the head components Ph are welded while the rib rb1 is engaged with the recess part r26 in the step B.

As described above, the weight member wt1 of the sole member s1 constitutes the projection part p1 (see FIG. 3). In the step B, the projection part p1 constituting the weight member wt1 is engaged with the recess part r2 (r21 shown in FIG. 4) corresponding to the projection part p1. The concavo-convex engagement enhances the positioning effect. The weight member wt1 enhances a degree of freedom for setting a position of a center of gravity. The weight member wt1 contributes to both the designing of the position of the center of gravity and the positioning effect.

Although not shown in the drawings, the inner surface of the face member f1 has a thick part formed in the central part thereof. The thick part also falls into the above-mentioned projection part p1. A recess part r22 is formed in the central part of the face member abutting part f2 so as to correspond to the thick part (see FIG. 4). In the step B, the recess part r22 is engaged with the projection part p1 (not shown) which is the thick part. The concavo-convex engagement enhances the positioning effect.

Although not shown in the drawings, the inner surface of the face member f1 has an extending part. The extending part extends from the central part of the face member f1 to the peripheral part thereof. The extending part has a rib shape. The extending part also falls into the above-mentioned projection part p1. A recess part r23 is formed in the face member abutting part f2 so as to correspond to the extending part (see FIG. 4). In the step B, the recess part r23 is engaged with the projection part p1 which is the extending part. The concavo-convex engagement enhances the positioning effect.

As described above, in the step B, the hosel member h1 (tubular part 14) is inserted into the hosel member inserting hole h3. The tubular part 14 has a cylindrical shape. The outer diameter of the tubular part 14 is substantially equal to the inner diameter of the hosel member inserting hole h3. It is easy to make the outer diameter of the tubular part 14 having a circular cross section coincide with the inner diameter of the hole h3. The positioning provided by the insertion has excellent accuracy. The insertion enhances the positioning effect.

In the step B, welding is performed. Examples of the kind of the welding include gas welding, arc welding, and laser welding. Examples of the arc welding include TIG welding and plasma welding. Examples of a laser used for the laser welding include a YAG laser and a $CO_2$ laser.

Preferably, the welding in the step B includes local welding and overall welding. Typical example of the local welding is stop welding. Examples of a method for the stop welding include spot welding. Preferably, the overall welding is performed after the local welding. A head specification may be measured after the local welding. The overall welding may be performed after the head specification is corrected based on the measurement result of the head specification. Examples of the head specification include a loft angle, a lie angle, and a face angle. Examples of the loft angle include an original loft angle and a real loft angle.

In the step C, the guide core gc1 is removed. As described above, the head 2 has the communicating hole Th1. The guide core gc1 is removed by utilizing the communicating hole Th1.

In the step C, the guide core gc1 is turned into a form capable of passing through the communicating hole Th1. Examples of the form include a fluid and a crushing object. The crushing object can be obtained by physical stimulation such as vibration, for example. The fluid can be obtained by melting and dissolving, for example. As described later, more preferably, the material of the guide core gc1 has a water solubility. In this case, water is injected from the communicating hole Th1 to dissolve the guide core gc1. The water solution of the guide core gc1 is taken to the outside from the communicating hole Th1.

Holes other than the shaft hole 12 may be used as the communicating hole Th1. Since the communicating hole Th1 is the shaft hole 12 in the embodiment, it is not necessary to form the other holes. The shaft hole 12 is blocked by a shaft in the assembled golf club. Therefore, it is not necessary to separately prepare a member blocking the communicating hole Th1. The communicating hole Th1 may be formed at a position out of which the communicating hole Th1 is likely to make the guide core gc1 flow, and the communicating hole Th1 may be filled with a blocking member such as a badge, or welding or the like after the outflow. In this respect, the communicating hole Th1 may be formed in a sole member s11, for example.

A portion occupied by the guide core gc1 is changed into a cavity by removing the guide core gc1. The cavity forms at least a part of the hollow part of the head 2.

Figure 6:
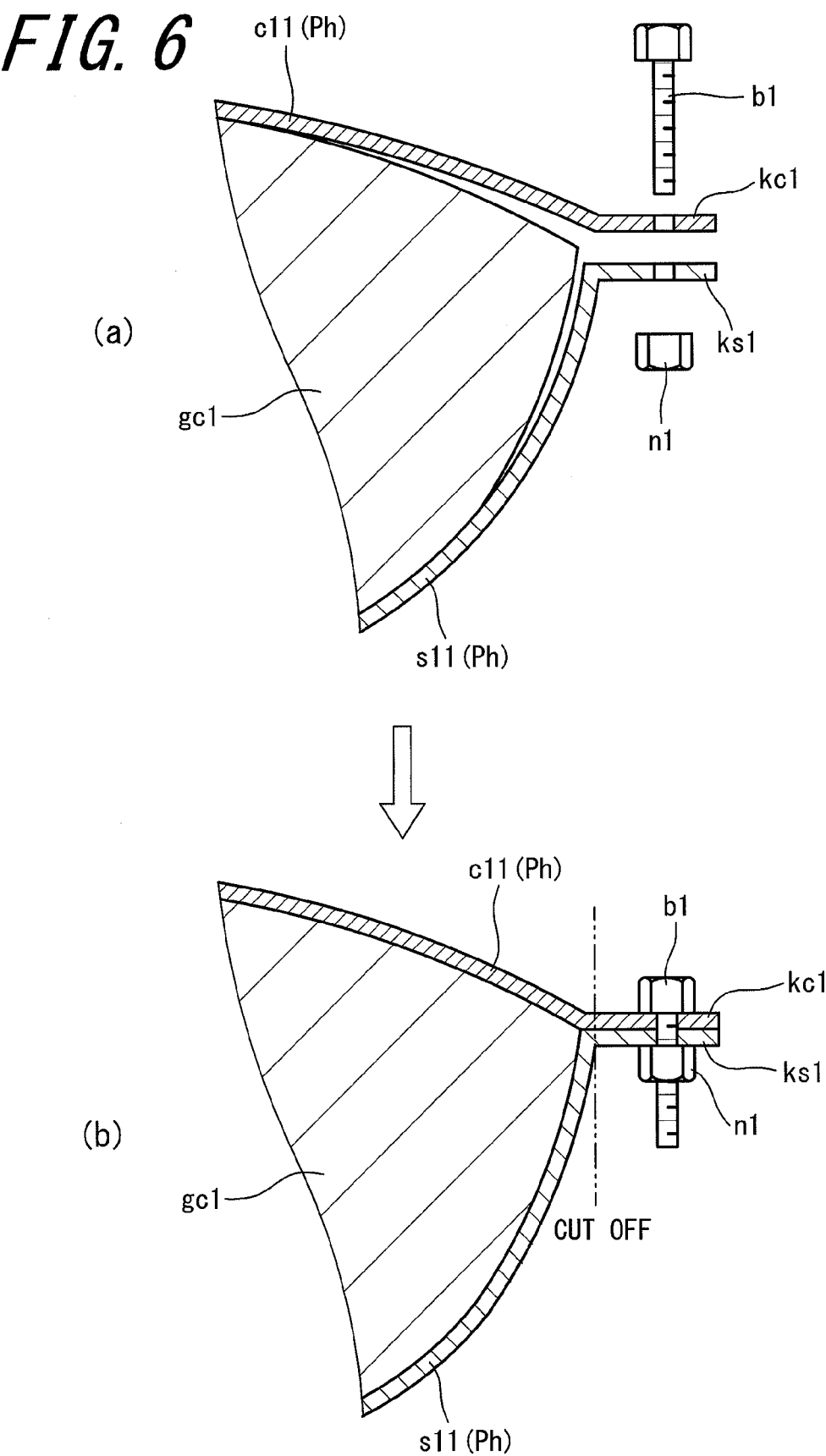
FIG. 6 is a cross-sectional view showing a manufacturing method as a modification.

FIG. 6 show an example of the engaging mechanism as the abutment maintaining mechanism. In the embodiment of FIG. 6, the sole member s11 is used in place of the sole member s1. The sole member s11 has a connecting part ks1. Furthermore, in the embodiment of FIG. 6, a crown member c11 is used in place of the crown member c1. The crown member c11 has a connecting part kc1.

Although not shown in the drawings, the sole member s11 has a plurality of connecting parts ks1. Although not shown in the drawings, the crown member c11 has a plurality of connecting parts kc1. The embodiment of FIG. 6 is the same as that of FIG. 2 except that the connecting parts are provided.

In the embodiment of FIG. 6, the connecting parts are connected to each other in the step B. In the embodiment, the connection is attained by screwing. The connection is attained by screw combination of a bolt b1 with a nut n1. The plurality of connecting parts ks1 and the plurality of connecting parts kc1 are connected by screw combination respectively.

The crown member c11 is formed by a press process. Springback is generated in the crown member c11. The springback causes a reduction in an abutting area between the crown member c11 and the guide core gc1 (see (a) of FIG. 6).

The sole member s11 is formed by a press process. Springback is generated in the sole member s11. The springback causes a reduction in an abutting area between the sole member s11 and the guide core gc1 (see (a) of FIG. 6).

Deformation decreasing the springback is generated by the connection between the connecting part kc1 and the connecting part ks1 (see (b) of FIG. 6). The contact area between the guide core gc1 and the head components Ph is increased by the connection. The increase in the contact area enhances the positioning effect.

Thus, the springback may be generated in at least one of the plurality of head components Ph. In this case, preferably, in the abutment in the step B, the head component Ph is deformed so that the springback is decreased.

Thus, it is preferable that the abutment maintaining mechanism is used in the abutment of the step B, and the head component Ph is deformed so that the springback is decreased by the abutment maintaining mechanism.

The connecting part kc1 and the connecting part ks1 do not exist in the completed head 2. The manufacturing method of the embodiment further includes the following step D:

(D) removing the connecting part kc1 and the connecting part ks1 after the welding in the step B.

The removal can be performed by cutting, for example. The step D may be performed in the step B. The connecting part is removed by utilizing the heating in the welding in the step B in a preferable example of removal. Since the removal and welding of the connecting parts can be simultaneously performed in this case, high productivity can be realized.

Figure 7:
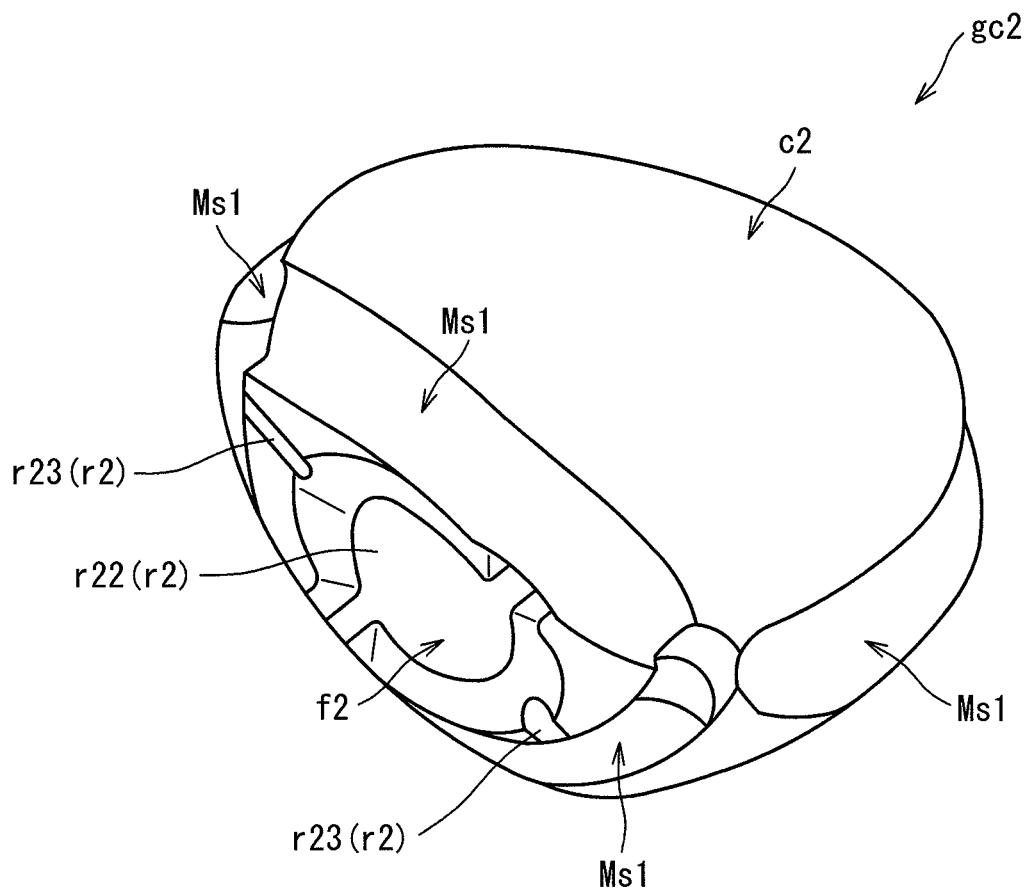
FIG. 7 is a perspective view showing a guide core as a modification.
Figure 8:
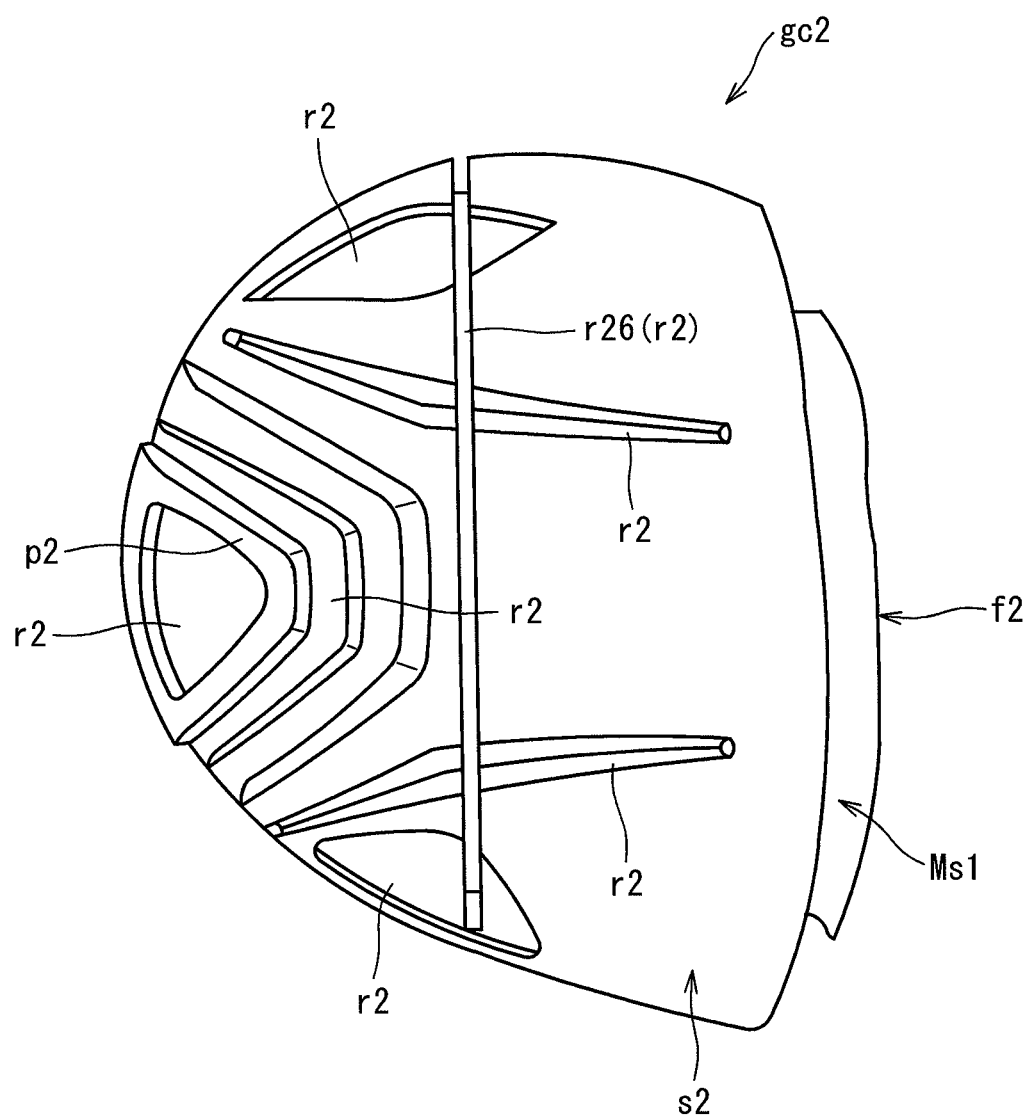
FIG. 8 is a bottom view of the guide core of FIG. 7.

FIG. 7 is a perspective view of a guide core gc2 as a modification. FIG. 8 is a bottom view of the guide core gc2. The guide core gc2 is used for producing the head 2.

The guide core gc2 has a lack part Ms1 which is lacked in relation to a shape of a hollow part of the head 2. The guide core gc2 is the same as the guide core gc1 except for the existence or non-existence of the lack part Ms1.

The lack part Ms1 is provided along at least a part of the welding joint part wd1. In the embodiment, the lack part Ms1 is provided along the whole of the welding joint part wd1. The contact between the welding joint part wd1 and the guide core gc2 is avoided in the step B by the existence of the lack part Ms1. Therefore, the heat of the welding is less transmitted to the guide core gc2. The heating of the guide core gc2 is suppressed by the welding joint part wd1. Therefore, the degree of freedom for selecting the material of the guide core gc2 can be improved. Therefore, for example, the guide core gc2 having a higher water solubility can be selected as a water solubility is given the priority over heat resistance.

Figure 9:
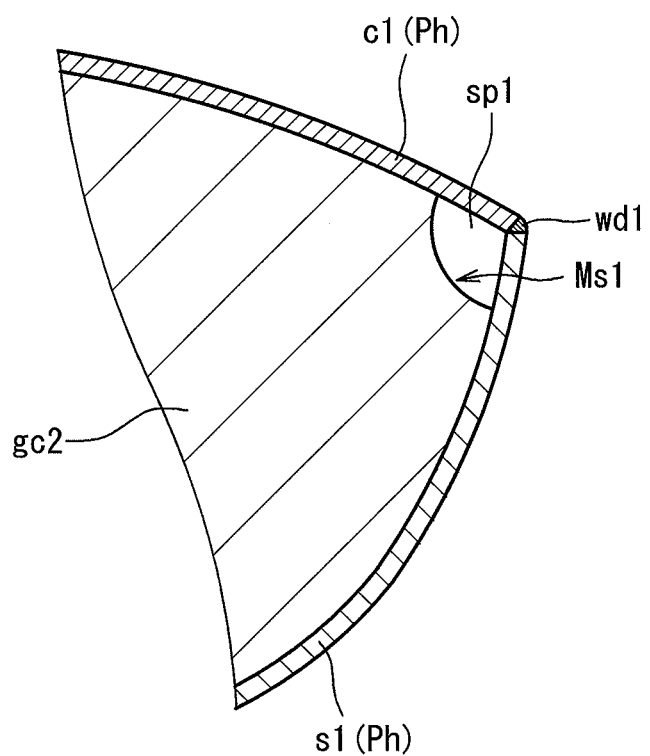
FIG. 9 is a cross-sectional view showing a state where a step B is performed by using the guide core of FIG. 7.

FIG. 9 shows the condition of the step B using the guide core gc2. As shown in FIG. 9, the lack part Ms1 exists, and thereby a space sp1 exists between the welding joint part wd1 and the lack part Ms1. The contact between the guide core gc2 and the welding joint part wd1 is avoided by the space sp1. The welding joint part wd1 means a welding bead and a portion melted by the welding. In respect of suppressing the heating of the guide core gc1, the shortest distance between the guide core gc2 and the welding joint part wd1 is preferably equal to or greater than 3 mm, more preferably equal to or greater than 5 mm, and still more preferably equal to or greater than 7 mm. In respect of preventing the contact area between the head components Ph and the guide core gc2 from being excessively lowered, the shortest distance between the guide core gc2 and the welding joint part wd1 is preferably equal to or less than 15 mm, more preferably equal to or less than 13 mm, and still more preferably equal to or less than 11 mm.

[Guide Core]

Examples of a method for manufacturing the guide core include molding using a mold and cutting out. The guide core can be molded by using a core mold capable of manufacturing a core for casting, for example. Pressure and/or heat may be applied in the molding using the mold. Preferably, the guide core is manufactured by making at least a part of three-dimensional data of the inner surface of the head coincide with at least a part of three-dimensional data of the outer surface of the guide core. The positioning effect is enhanced by commonizing the three-dimensional data.

In the molding using the mold, the mold is preferably produced by an NC process. Preferably, the three-dimensional data of the inner surface of the head is used for the NC process of the mold. The three-dimensional data of the inner surface of the head is used, and thereby the three-dimensional data of the inner surface of the head can coincide with the three-dimensional data of the outer surface of the guide core with accuracy. Therefore, the shape of the guide core can be produced with accuracy. The high accuracy enhances the positioning effect. NC stands for Numerical Control.

In the case of the cutting out, the guide core is preferably cut by the NC process. Preferably, the three-dimensional data of the inner surface of the head is used for the cutting process. The three-dimensional data of the inner surface of the head is used, and thereby the three-dimensional data of the inner surface of the head coincides with the three-dimensional data of the outer surface of the guide core. Therefore, the shape of the guide core can be produced with accuracy.

[Material of Guide Core]

The material of the guide core is not limited. For example, a material capable of being used for a core for injection molding or casting can be used also for the guide core. Preferably, the guide core is made of a water-soluble material.

Examples of a base material of the guide core include a metal, a resin, a ceramic, a wax, a mixture of a metal powder and a binder, a calcia material, casting sand, a mineral salt, a water-soluble polymer, sugar, a salt, ice, and a water-soluble powder material. Examples of the water-soluble powder material include potassium carbonate, sodium carbonate, sodium chloride, or a mixture thereof. Examples of the ceramic include boron nitride and magnesium oxide. The water-soluble powder materials and the ceramics have heat resistance. The potassium carbonate, the sodium carbonate, the sodium chloride, or the mixture thereof further has a water solubility.

In light of the step C, a guide core removal property is preferably high. In respect of a guide core removal property, the material of the guide core preferably has a water solubility, a solvent solubility, or a melting property, and more preferably a water solubility.

The base material of the guide core may be a resin. Examples of the resin include a synthetic resin. Examples of the synthetic resin include polyethylene and paraffine. In respect of the guide core removal property, the resin is preferably dissolved in a solvent. The resin is more preferably a water-soluble resin. Examples of the water-soluble resin include a polyvinyl alcohol resin, a hydroxypropylcellulose resin, an alkylcellulose resin, a polyvinyl butyral resin, and a polyvinyl formal resin. In respect of heat resistance and a strength, the polyvinyl alcohol resin preferably contains an oxyalkylene group. In respect of the heat resistance and the strength, a composition in which an inorganic filler is blended in the polyvinyl alcohol resin is more preferable. Examples of the inorganic filler include talc, mica, a carbon fiber, a glass fiber, a glass bead, a hollow glass bead, a silica particle, aluminum oxide, calcium carbonate, titanium oxide, zinc oxide, zirconium oxide, aluminosilicate, mica, barium sulfate, calcium phosphate, kaolin, zeolite, iron, titanium, nickel, copper, magnesium, tin, lead, zinc, a metal salt, a crosslinking silicon resin, and whisker-like calcium carbonate.

The base material of the guide core may be a metal. Examples of the metal include a low-melting-point metal. Examples of the low-melting-point metal include tin, lead, bismuth, and an alloy containing them. Other examples of the low-melting-point metal include a Zn—Al—Cu alloy, a Zn—Al—Mg alloy, a Zn—Sn—Mg alloy, and a Zn—Sn—Cu alloy. In respect of the guide core removal property, the melting temperature of the low-melting-point metal is preferably equal to or less than 200° C., more preferably equal to or less than 150° C., and still more preferably equal to or less than 100° C. The guide core removal property is enhanced by using the low-melting-point metal.

In light of the heat of the welding, the base material of the guide core preferably has high heat resistance. However, since the heating in the welding is local heating, the temperature of the guide core is not higher than the heating temperature of the welding. Particularly, in the laser welding, the heating of the guide core is reduced. Even a material of which heat resistance is not so high can be used for the guide core.

A preferable example of the base material of the guide core is the calcia material. Examples of the calcia material include calcia, calcia-magnesia, and calcia-zirconia. The calcia is CaO. The magnesia is MgO. The zirconia is $ZrO_2$. The calcia material is water soluble. In respect of enhancing the water solubility, the calcia material preferably contains calcia of 80% by weight or greater.

One of other preferable examples of the base material of the guide core is a salt. Examples of the salt include sodium carbonate, potassium chloride, sodium chloride, and a combination thereof. These materials may have a water solubility.

One of other preferable examples of the base material of the guide core contains alumina sand and a caking additive. Examples of the caking additive include tripotassium phosphate and/or sodium aluminate. These materials may have a water solubility.

One of other preferable examples of the base material of the guide core is sodium metasilicate, sodium disilicate, and a mixture thereof. Sodium chloride, potassium chloride, or the mixture thereof can also be used as the material of the guide core. Furthermore, sodium sulfate, lithium sulfate, barium sulfate, and a mixture thereof can also be used as the material of the guide core. These have a water solubility. These can be melt-molded.

Examples of the casting sand include natural sand and synthetic sand. The typical casting sand is silica sand. The common casting sand consists primarily of $SiO_2$. The common casting sand contains silicic acid ($SiO_2$) of equal to or greater than 50% by mass. The common casting sand contains alumina ($Al_2O_3$) and iron oxide ($Fe_2O_3$) besides the silicic acid ($SiO_2$). In respect of the heat resistance, a preferable example of the casting sand is mullite artificial sand.

One of the other preferable examples of the base material of the guide core is casting sand to which a binder is added. Examples of the common binder include clay, bentonite, and cement.

Examples of the binder include an inorganic binder and an organic binder. Examples of the inorganic binder include a mineral salt. Examples of the organic binder include a resin. Examples of the resin of the binder include a phenol resin and a furan resin. Examples of the inorganic binder include sodium carbonate, calcium sulfate, and magnesium sulfate. Calcium sulfate and magnesium sulfate may be used in combination. When the magnesium sulfate is used, a good water solubility can be attained. Other examples of the inorganic binder include sodium chloride, lithium sulfate, magnesium sulfate, and a mixture thereof. When these inorganic binders are used, the guide core having a water solubility can be realized. The inorganic binder is preferably a water-soluble mineral salt binder.

In respect of the heat resistance, a filler may be added to the binder. Examples of the filler include kaolinite, dickite, halloysite, ball clay, calcined kaolin, barium sulfate, and sodium chloride. Preferable examples of the filler include silica sand (silica powder), alumina, potassium titanate, silicon carbide, zircon silicate, fibrous potassium titanate, titanium oxide, zinc oxide, iron oxide, and magnesium oxide.

One of other preferable examples of the base material of the guide core is casting sand to which a binder is added. The surface of the casting sand particle is covered with the water-soluble mineral salt binder. In this case, a guide core having a water solubility can be realized. Preferable examples of the water-soluble mineral salt binder include a water-soluble mineral salt binder in which an inorganic filler is added to a water-soluble mineral salt. A guide core having excellent heat resistance and an excellent water solubility can be obtained by adding the inorganic filler. Besides the above-mentioned filler, examples of the inorganic filler include one or more selected from silica sand (silica powder), alumina, potassium titanate, silicon carbide, zircon silicate, fibrous potassium titanate, titanium oxide, zinc oxide, iron oxide, and magnesium oxide.

Examples of the water-soluble mineral salt include one or more water-soluble mineral salts consisting of combinations of cations selected from a magnesium ion, a sodium ion, and a calcium ion and anions selected from $SO_4^{2-}$, $CO_3^{2-}$, $HCO_3^{2-}$, and $B_4O_7^-$. In respect of a water solubility, the water-soluble mineral salt is preferably magnesium sulfate ($MgSO_4$). In respect of the water solubility, one or more selected from magnesium sulfate ($MgSO_4$), sodium carbonate ($Na_2CO_3$), sodium tetraborate ($Na_2B_4O_7$) and sodium sulfate ($Na_2SO_4$) are also preferable. In respect of the heat resistance and the strength, it is preferable that the amount of the mineral salt binder is 0.8 to 10 parts by weight, and the amount of the inorganic filler is 0.2 to 10 parts by weight based on 100 parts by weight of the casting sand. Other preferable examples of the material of the guide core include a kneaded product obtained by kneading a water solution of the water-soluble mineral salt binder and the casting sand.

A preferable example of the water-soluble mineral salt contains 50 to 98% by weight of magnesium sulfate and 2 to 50% by weight of a mineral salt X. The mineral salt X is one or more selected from sodium carbonate, sodium tetraborate, and sodium sulfate. When the water-soluble mineral salt is used, heat resistance and a water solubility can be improved.

In conventional welding, the head components Ph are sequentially welded. For example, the face member f1 and the sole member s1 are fixed by a jig, and welded to obtain a welded body A. Next, the welded body A and the hosel member h1 are fixed by the jig, and welded to obtain a welded body B. Next, the welded body B and the crown member c1 are welded to obtain a welding-finished product. These processes require much time and labor. In the embodiment, it is also possible to fix all the members to the guide core gc1 and to weld the members. The manufacturing process of the head can be simplified by the embodiment. In the embodiment, the simplification of the manufacturing process can be attained in addition to the positioning effect.

In the embodiment, all the head components Ph are abutted on the guide core gc1. In the step B, all the head components Ph may not be abutted on the guide core gc1. For example, only the two head components Ph may be abutted on the guide core gc1. For example, the head 2 may be manufactured by the following steps:

(step 1) a welded body X is obtained by abutting the sole member s1 and the face member f1 on the guide core gc1 and welding both the sole member s1 and the face member f1 in the step B;

(step 2) the guide core gc1 is removed from the welded body X; and (step 3) the hosel member h1 and the crown member c1 are welded to the welded body X from which the guide core gc1 is removed.

Also in this case, the positioning effect is exhibited between the sole member s1 and the face member f1 in the step 1. In this case, the removal (step C) of the guide core gc1 is facilitated. Meanwhile, in respect of further enhancing the positioning effect, all the head components Ph are preferably abutted on the guide core gc1 in the step B.

EXAMPLES

Hereinafter, the effects of the present invention will be clarified by examples. However, the present invention should not be interpreted in a limited way based on the description of the examples.

Examples

A head having the same structure as the above-mentioned head 2 was produced. A crown member was obtained by subjecting a rolled material to a press process. A face member was manufactured by forging. A sole member was obtained by subjecting a rolled material to a press process. A rib and a weight member were separately produced, and welded to the inner surface of the sole member. A hosel member was obtained by subjecting pure titanium to an NC process.

A guide core shown in FIG. 4 was produced. Casting sand and a binder were used as the material of the guide core. Mullite artificial sand was used as the casting sand. Magnesium sulfate was used as the binder. The casting sand and the binder were kneaded. The blending ratio of the mullite artificial sand was set to 97.5% by weight, and the blending ratio of the binder was set to 2.5% by weight. The kneaded material was pushed into a mold for the guide core. The mold was heated at 150° C. for 30 minutes to obtain a guide core having a water solubility. The data of the forming surface of the mold for the guide core was set to the same as the data of the inner surface of the head.

Next, all head components were abutted on the guide core. The crown member, the face member, and the sole member were fixed along the guide core by an external jig. The crown member, the face member, and the sole member were welded in the state where the members were fixed. Water was put into an ultrasonic washing machine having a water storage part, and the welded head was immersed in the water. The ultrasonic washing machine was operated to dissolve the guide core in water. The dissolved water was discharged from a shaft hole to obtain heads of examples.

Comparative Examples

The same heads as the examples were produced by using the same plurality of head components as the examples. A face member and a sole member were fixed by a jig. The face member and the sole member were subjected to stop welding and final welding to obtain a member A. The member A and a hosel member were fixed by the jig. The member A and the hosel member were subjected to stop welding and final welding to obtain a member B. The member B and a crown member were fixed by the jig. The member B and the crown member were subjected to stop welding and final welding to obtain heads of comparative examples.

The five examples and the five comparative examples were produced. For each head, a real loft angle, a lie angle, and a face angle were measured. Variation was evaluated for each specification. The variation is a difference between the maximum value and the minimum value.

In the examples, the variation in the real loft angle was 1.0 degree; the variation in the lie angle was 1.0 degree; and the variation in the face angle was 2.0 degrees.

In the comparative examples, the variation in the real loft angle was 3.0 degrees; the variation in the lie angle was 3.0 degrees; and the variation in the face angle was 5.0 degrees.

Thus, the examples are more excellent than the comparative examples. The advantages of the present invention are apparent.

The invention described above can be applied to all golf club heads.

The description hereinabove is merely for an illustrative example, and various modifications can be made in the scope not to depart from the principles of the present invention.

What is claimed is:
1. A method for manufacturing a golf club head, comprising the steps of:
  (A) producing a plurality of head components including a face member;

(B) welding at least two of the head components to each other while abutting the head components on a guide core, one of said at least two of the head components that are welded in the step (B) being the face member; and (C) removing the guide core, wherein the golf club head on the guide core includes a face; a crown; a sole; and a hosel, the face member constituting at least a part of the face.

2. The method according to claim 1, wherein the guide core is made of a water-soluble material.

3. The method according to claim 1, wherein at least one of the head components is produced by a press process.

4. The method according to claim 1, wherein the guide core includes a recess located at a welding joint formed during welding in step (B) such that the guide core avoids contact with the welding joint.

5. The method according to claim 1, wherein each of at least two of the head components has a connecting part; the connecting parts are connected to each other in the step (B); and the contact area between the guide core and the head components is increased by the connection in the abutment in step (B).

6. The method according to claim 5, further comprising the step of:

(D) removing the connecting parts after the welding.

7. The method according to claim 1, wherein all the head components are abutted on the guide core in step (B).

8. The method according to claim 1, wherein before welding is completed in step (B), at least two of the head components are abutted on the guide core and a head specification including loft angle, lie angle and/or face angle is measured.

9. The method according to claim 1, wherein at least one of the head components has a projection provided on an inner surface side thereof;

the guide core has at least one recess; and the projection is engaged with the recess in the abutment of step (B).

10. The method according to claim 1, wherein at least one of the head components has a recess formed on an inner surface side thereof;

the guide core has at least one projection; and the recess is engaged with the projection in the abutment of step (B).

11. The method according to claim 5, wherein springback is generated in at least one of the head components;

deformation decreasing the springback is generated by the connection of the connecting parts; and the contact area between the guide core and the head components is increased by the deformation.

12. The method according to claim 1, wherein the head components further include a sole member, and a welded body is obtained by abutting the sole member and the face member on the guide core and welding both the sole member and the face member in the step (B).

13. The method according to claim 1, wherein the head components further include a sole member and a crown member, and wherein the face member, the crown member and the sole member are welded in the step (B).

\* \* \* \* \*